Figure 1:
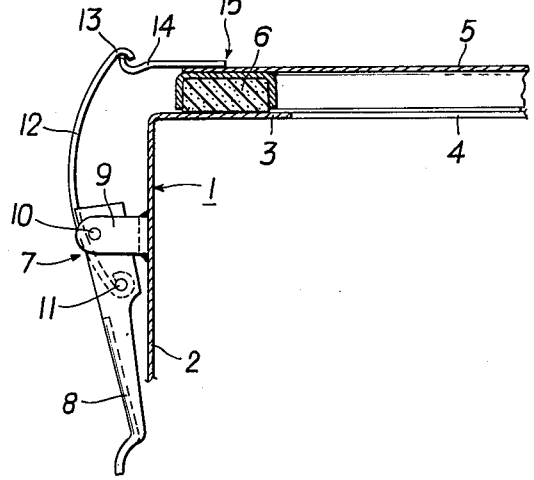

United States Patent [19]

Fachbach

[11] 3,997,203
[45] Dec. 14, 1976

[54] QUICK-ACTING LOCKING DEVICE FOR THE DETACHABLE CONNECTION OF A REMOVABLE HOUSING ELEMENT

[75] Inventor: Heinz Fachbach, Graz, Austria

[73] Assignee: Hans List, Graz, Austria

[22] Filed: Aug. 4, 1975

[21] Appl. No.: 601,650

[30] Foreign Application Priority Data

Aug. 5, 1974   Austria .............................. 6407/74
Sept. 17, 1974  Austria .............................. 7509/74

[52] U.S. Cl. ........................ 292/247; 292/DIG. 49
[51] Int. Cl.[2] .......................................... E05C 5/02
[58] Field of Search .......... 292/113, 114, 196, 241, 292/247, DIG. 49

[56] References Cited

UNITED STATES PATENTS

| 1,414,407 | 5/1922 | Harvey | 292/247 |
| 1,525,046 | 2/1925 | Putter | 292/196 X |
| 1,863,863 | 6/1932 | Marbach | 292/113 |

FOREIGN PATENTS OR APPLICATIONS

| 1,326,522 | 3/1962 | France | 292/247 |
| 179,937 | 7/1962 | Sweden | 292/113 |

Primary Examiner—Richard E. Moore
Attorney, Agent, or Firm—Watson, Cole, Grindle & Watson

[57] ABSTRACT

A quick-acting locking device for the detachable connection between a removable housing element, particularly a maintenance cover, and a stationary housing element, comprising at least one cocking lever pivoted on the removable housing element and a flat spring acting as a bending spring and forming two legs, one of the legs engaging with its extremity in the border of the removable housing element.

6 Claims, 5 Drawing Figures

QUICK-ACTING LOCKING DEVICE FOR THE DETACHABLE CONNECTION OF A REMOVABLE HOUSING ELEMENT

The present invention relates to a quick-acting locking device for the detachable connection between a removable housing element, particularly of a maintenance cover, and a stationary housing element, comprising at least one cocking lever pivoted on one of the housing elements and a flat spring to be pre-stressed by means of said cocking lever and engaging the other housing portion.

Similar quick-acting locking devices are used in connection with machine housings, sound-proofingly encased motors and the like, in order to speedily expose such parts of the machine as require attendance without any major assembling effort and to cover same again following completion of the maintenance job. Apart from complicated and therefore, expensive locking elements to be used for that purpose, commercial locking devices are also available which meet the requirements of ready detachability, durability and low costs. However, the usefulness of such types of locking devices is limited by the fact that they permit of producing forces approximately only in the direction of a connecting line perpendicularly intersecting the axis of rotation of the cocking lever and the axis of rotation of the flat spring articulated thereto. Therefore, conventional quick-acting locking devices are suitable for use only in such cases where it is possible to mount the locking device approximately in perpendicular relation to the supporting portion and/or sealing surface of the detachable housing element. However, this rarely occurs in actual practice, particularly in such cases where a maintenance cover or any other similar housing element is used to cover an aperture in a large-sized, essentially plane housing element.

It is therefore, the object of the invention to provide a quick-acting locking device of the type here-above described which permits the easy attachment of a removable housing element to a larger housing element of essentially flat design, while keeping manufacturing expenses as low as possible by using commercial types of locking devices as far as practicable.

According to the invention, the flat spring is designed as an approximately rectangular, two-legged bending spring of which one leg can be attached to a retaining clip protruding outwardly from the stationary housing element, the extremity of the leg engaging the border of the removable housing member, whereas a connecting clamp is hinged to the other leg protruding outwardly from the housing surface, the other extremity of said connecting clamp being hinged to the cocking lever located on the removable housing element.

As a result it is possible to speedily and conveniently attach maintenance covers or similar removable housing elements which are located in the same plane or in parallel relation to the housing surface concerned to the housing, it being possible to transfer the cocking levers and their bearing blocks unaltered from conventional locking devices of the spring-bolt type. In particular, it will be possible to alter the pressure applied by the removable housing element to the stationary housing in accordance with requirements by appropriately dimensioning the two legs of the flat spring. Again, the applied pressure can be varied as required by the characteristic properties of the flat spring.

An important field of applications for the invention is the easily detachable connection of maintenance covers of soundproofingly encased machines, such as of internal combustion engines. In this connection, it is important to be able to rapidly perform attendance jobs or adjustments of engine parts located within the encasing if required. In addition, it may become necessary to provide oil-tightness of the soundproof encasing if the same or any part thereof constitutes the oil-wetted outer jacket of the engine. In similar cases it is possible, according to another embodiment of the invention, to provide for a maintenance cover carrying in a manner known per se on its inner surface a packing strip extending alongside its outer rim and tightly adjoining the external surface of the sound-proofing encasing around its maintenance aperture, the extremity of the leg of the flat spring suspended in the retaining clip engaging at a point of the external surface of the maintenance cover directly opposite the packing strip. This arrangement not only meets the requirements of convenient and speedy manipulation, but also ensures the necessary oil-tightness immediately upon the removal and reassembly of the maintenance cover.

According to another embodiment of the invention a particulary simple design of the quick-acting locking device results from the fact that the extremity of the flat spring leg protruding from the housing surface is bent to form an eyelet wherein the connecting clamp is hinged. In that case, the connecting clamp can be made of a chamfered U-shaped piece of wire in a simple manner, both ends of said wire being bent inwardly at right angles and inserted in lateral bores usually provided on the cocking lever. In conventional types of snap-action locks these bores serve to receive a pin to which one of the extremities of the flat spring designed as a spring clasp is hinged directly.

A particularly advantageous embodiment of the invention provides for the angle-plate of the quick-acting locking device designed as an essentially rigid element with the connecting piece formed by a pre-bent spring clasp of known design. This results in an additional important advantage reducing manufacturing expenses and facilitating production processes insofar as it is possible to use not only conventional bearing blocks and cocking levers but also the spring clasps of known quick-acting locks which are designed along the same or similar lines as known locking devices and are hinged to the cocking lever in a corresponding manner. Similar spring clasps constitute a proven element of quick-acting locking devices the pre-stress of which can be adapted by appropriately dimensioning the cross-section and the bending radius of the spring clasps in a simple manner so as to suit given requirements.

According to a further embodiment of the invention the angle plate can be designed as a wire strap closed upon itself approximately rectangularly and centrally angle-shaped, wherein the spring clasp engages flexibly with an extremity which is bent over eyelet-fashion. This produces additional savings of expense and material.

According to another feature of the invention the angle-plate can, however, also be designed as a sheet stamping blank. Such a blank can easily provided with the required flexural stiffness by the application of reinforcing seams or the like.

Figure 2:
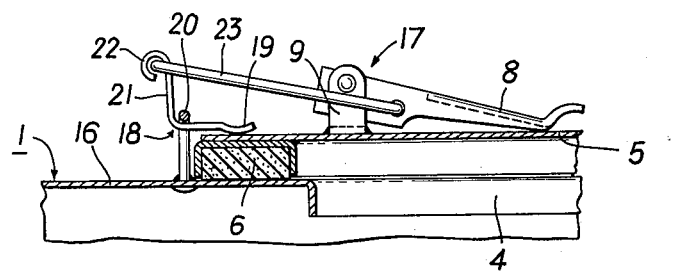
Figure 3:
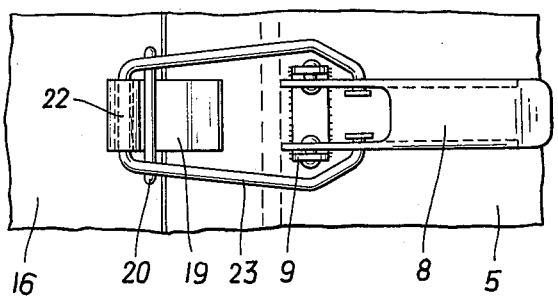
Figure 4:
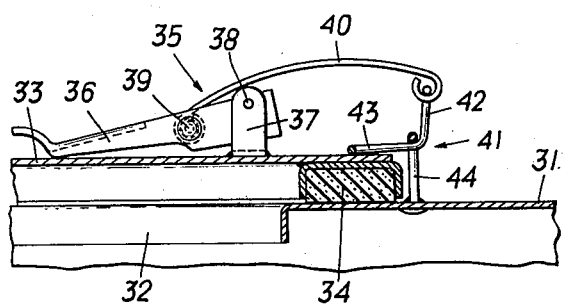
Figure 5:
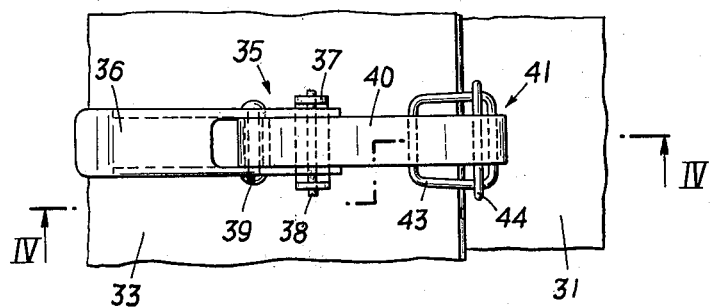

The invention will be further explained by the following description with reference to the accompanying drawings in which:

FIG. 1 shows a cross-section of a prior quick-acting locking device for a removable housing element, FIG. 2 is another cross-section of a quick-action locking device according to the invention, and FIG. 3 is a top plan view of the locking device shown in FIG. 2, FIG. 4 illustrates another embodiment of the quick-acting locking device according to the invention along line IV—IV of FIG. 5, and FIG. 5 is a top plan view of the locking device shown in FIG. 4.

In FIG. 1, reference numeral 1 designates a machine housing only partially illustrated, comprising an upper boundary wall 3 with a perforation 4. This perforation 4 through which a point requiring attendance inside the housing 1 of the machine not shown in the drawing can be gained access to, can be closed by means of a maintenance cover 5 carrying an elastic packing strip 6 extending along its outer rim on its inside.

The connection between the maintenance cover 5 and the housing 1 is achieved by means of a plurality of quick-acting locking devices 7, of which one only is shown in the drawing. Each of these quick-acting locking devices 7 comprises a cocking lever 8 located in a U-shaped bearing block 9 orientable about the axis 10. The bearing block 9 is attached to the sidewall of the housing 1 by welding in such a way as to be outwardly projecting. The two sidewalls of the cocking lever 8 of a U-shaped cross-section are provided with through bores receiving a pin 11 to which the one eyelet-shaped extremity of a spring clasp 12 is hinged. The other extremity 13 of the spring clasp 12 which is bent hook-fashion engages a clip 14 welded to the outside of the maintenance cover 5. In the closing position of the quick-acting locking device shown in the drawing the spring clasp 12 is pre-stressed and transmits via the flap 14 a contact pressure acting in the direction of the arrow 15 to the maintenance cover 5 so that the packing strip 6 is tightly applied to the upper boundary wall 3 of the housing. As will be seen from the drawing, similar conventional quick-locking devices can be used only in such cases where a clamping face located in a perpendicular relation to the plane of the maintenance cover 5, such as the sidewall 2 in the illustrated instance, is available for the quick-acting closing device 7.

FIGS. 2 and 3 illustrate the connection between a maintenance cover 5 and a housing wall 16 having essentially a plane surface by means of quick-action locking devices 17 designed according to the invention, the elements corresponding to the known design according to FIG. 1 being provided with the same reference numbers as in FIG. 1. As different from the known design, the bearing blocks 9 of the cocking levers 8 are welded to the outside of the maintenance cover 5. Instead of the spring clasp 12 a bending spring 18 warped at an approximately right angle and comprising two legs is used, one of the legs 19 being suspendable in a U-shaped retaining clip 20 protruding outwardly from the housing wall 16. The extremity of the spring leg 19 engages on the outside of the cover 5 at a point directly opposite the packing strip 6.

The other leg 21 of the bending spring 18, protruding outwardly in relation to the housing wall 16, is bent at its free extremity to form an eyelet 22, wherein the central portion of a U-shaped connecting clamp 23 is hinged. The two leg ends of clamp 23 are bent inwardly and engage the aligned bores of the cocking lever 8 which otherwise receive pin 11 in conventional quick-action locking devices.

By means of this arrangement the bending spring 18 is pre-stressed by clamp 23 into the closing position illustrated in the drawing as the cocking lever 8 is depressed and the leg 19 of the bending spring 18 consequently exerts a contact pressure on the rim of the maintenance cover 5 in the area of the packing strip 6, said contact pressure being directed in a perpendicular relation to the housing wall 16. As a result, a soundproof and if necessary oil-tight connection between the maintenance cover 5 and the housing 1 is achieved.

In the embodiment of the invention shown in FIGS. 4 and 5, 31 designates a stationary housing element having a plane surface, such as the wall of a soundproofing encasing of an international combustion engine. This stationary housing element 31 is provided with a maintenance aperture 32 which can be closed by means of a removable housing element, such as a maintenance cover 33 carrying an elastic packing strip 34 extending along its outer border on the inside.

The detachable connection between the maintenance cover 33 and the stationary housing element 31 is produced by a plurality of quick-action locking devices 35 distributed over the periphery of the maintenance cover 33, only one of which is illustrated in the drawing. Each of these quick-action locking devices 35 comprises a cocking lever 36 located in a U-shaped bearing block 37 and pivotable about a pin 38. The bearing block 37 is conveniently attached to the outer side of the maintenance cover 33 such as by welding. The two sidewalls of the cocking lever 36 of a U-shaped cross-section are provided with aligned bores for receiving a pin 39 to which one extremity of a pre-bent spring clasp 40 formed as an eyelet is hinged.

To the other extremity of the spring clasp 40 which is also bent eyelet-fashion, an angle plate 41 is hinged with one of its legs 42. This angle plate 41 is designed as a wire strap closed upon itself approximately rectangularly and of a centrally angle-shaped form, whose leg 43 which is parallel to the housing surface can be suspended in a U-shaped retaining clip 44 attached to the stationary housing element 31 close to the outer border of the maintenance cover 33 in an outwardly protruding manner, such as by welding. The free extremity of the leg 43 engages in the outside of the maintenance cover 33 at a point directly opposite the packing strip 34.

By means of this arrangement the spring clasp 40 is pre-stressed as the cocking lever 36 is depressed into closing as position illustrated in the drawing and transmits its tensional force via the angle plate 41 to the border of the maintenance cover 33, so that the same is pressed to the stationary housing element 31 with the packing strip tightly in the area around the maintenance aperture 32. Thus a soundproof and if necessary also oil-tight connection between the maintenance cover 33 and the stationary housing element 31 is achieved.

As different from the quick-action locking device hereabove described it would also be possible to use a variant wherein the angle plate is a sheet trimming provided with additional corrugations for the purpose of increasing the bending strength of the device.

I claim:

1. A quick-acting locking device for the detachable connection of a removable housing element, in particular of a maintenance cover, with a stationary housing element, comprising at least one cocking lever hinged to the removable housing element, a retaining clip attached to the stationary housing element and protruding therefrom, an essentially flexurally stiff angle plate suspended in the said retaining clip, one of the legs of the angle plate engaging with its free extremity the border of the removable housing element, the other leg of said angle plate protruding outwardly, a bent spring clasp, one end of the clasp being hinged to the outwardly protruding leg of said angle-plate, and the other end of the clasp being hinged to said cocking lever.

2. A quick-acting locking device as claimed in claim 1, wherein the angle-plate is a wire bow substantially self-enclosed rectangularly and centrally angle-shaped, said one end of said spring clasp forming an eyelet hingedly connected to the wire bow.

3. A quick-acting locking device as claimed in claim 1, wherein the angle-plate is a sheet trimming.

4. A quick-acting locking device for the detachable connection between a stationary and a removable element of a housing, particularly between an engine casing and a maintenance cover, comprising a stationary housing element, a removable housing element detachably connected to the stationary housing element, at least one cocking lever pivoted on the removable housing element, a flat spring acting as a bending spring which is substantially bent into a right angle forming two legs, a retaining clip attached to the stationary housing element and protruding outwardly from the same, said flat spring being suspended in said retaining clip, one leg of said spring engaging with its extremity in the border of the removable housing element, the other leg of said spring protruding outwardly from said housing element, a connecting clamp being hinged with one extremity thereof to the outwardly protruding leg and with the other extremity thereof hinged to said cocking lever.

5. A quick-acting locking device as claimed in claim 4, wherein the stationary housing element is a sound-proofing engine casing having a maintenance aperture, and the removable housing element is a maintenance cover closing said maintenance aperture of the engine casing, a packing strip provided alongside the border on one side of the maintenance cover and adjoining the entire border of the maintenance aperture, said one of the legs of the flat spring suspended in the retaining clip engaging on the border of the maintenance cover on its opposite side.

6. A quick-acting locking device as claimed in claim 4, wherein the extremity of the leg of the flat spring protruding outwardly from said housing elements is formed as an eyelet wherein said connecting clamp is hinged.

* * * * *